US012773921B2

(12) United States Patent
Jeon

(10) Patent No.: US 12,773,921 B2
(45) Date of Patent: Oct. 27, 2026

(54) METHOD FOR CONTROLLING CHARGING A VEHICLE WITH AN ADD-ON MOBILITY APPARATUS CONNECTED THERETO AND AN ELECTRIC VEHICLE ACCORDING TO THE SAME

(71) Applicants: Hyundai Motor Company, Seoul (KR); Kia Corporation, Seoul (KR)

(72) Inventor: Jae Woo Jeon, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 290 days.

(21) Appl. No.: 18/752,996

(22) Filed: Jun. 25, 2024

(65) Prior Publication Data

US 2025/0058667 A1 Feb. 20, 2025

(30) Foreign Application Priority Data

Aug. 14, 2023 (KR) ........................ 10-2023-0106230

(51) Int. Cl.

*B60L 53/00* (2019.01)
*B60L 50/60* (2019.01)
*B60L 53/62* (2019.01)
*G01C 21/34* (2006.01)
*G07C 5/02* (2006.01)

(52) U.S. Cl.

CPC ............... *B60L 53/62* (2019.02); *B60L 50/60* (2019.02); *G01C 21/3469* (2013.01); *G07C 5/02* (2013.01)

(58) Field of Classification Search

CPC ........................................................ B60L 53/00
See application file for complete search history.

(56) References Cited

U.S. PATENT DOCUMENTS

| | | | | |
|---|---|---|---|---|
| 6,390,215 | B1 | 5/2002 | Kodama et al. | |
| 8,676,400 | B2 | 3/2014 | Tippelhofer et al. | |
| 9,937,815 | B2 | 4/2018 | Smidebrant et al. | |
| 2017/0203658 | A1* | 7/2017 | Jang | B60L 1/00 |
| 2020/0076223 | A1* | 3/2020 | Kuriki | B60L 50/66 |
| 2023/0106720 | A1* | 4/2023 | Othman | B60L 50/60 320/109 |
| 2023/0182610 | A1* | 6/2023 | Matsushita | B60L 53/12 700/297 |
| 2023/0406150 | A1* | 12/2023 | Choi | B60L 1/00 |
| 2024/0067045 | A1* | 2/2024 | Chen | B60L 15/20 |

FOREIGN PATENT DOCUMENTS

| | | | | | |
|---|---|---|---|---|---|
| CN | 110015111 | A | | 7/2019 | |
| DE | 112016006782 | T5 | * | 1/2019 | B60L 50/60 |
| JP | H10-080006 | A | | 3/1998 | |
| KR | 20210151028 | A | * | 12/2021 | B60L 58/12 |
| KR | 2022-0147528 | A | | 11/2022 | |
| KR | 20230083864 | A | * | 6/2023 | B60L 58/12 |
| WO | WO-2024172786 | A1 | * | 8/2024 | B60L 58/12 |

* cited by examiner

*Primary Examiner* — Suresh Suryawanshi
(74) *Attorney, Agent, or Firm* — Banner & Witcoff, Ltd.

(57) ABSTRACT

A method for an electric vehicle involves a controller determining if a second battery is connected to a first battery via a connector. If so, it identifies charging stations near the electric vehicle's destination and outputs charging plans through a user interface. The charging plans may include recommended charging stations. Users may then use the user interface to input commands for executing the charging plans during driving.

20 Claims, 6 Drawing Sheets

METHOD FOR CONTROLLING CHARGING A VEHICLE WITH AN ADD-ON MOBILITY APPARATUS CONNECTED THERETO AND AN ELECTRIC VEHICLE ACCORDING TO THE SAME

CROSS-REFERENCE TO RELATED APPLICATION

The present application claims priority to Korean Patent Application No. 10-2023-0106230, filed on Aug. 14, 2023, the entire contents of which is incorporated herein by reference in its entirety for all purposes.

TECHNICAL FIELD

The present disclosure relates to a method for controlling charging an electric vehicle with an add-on mobility apparatus connected thereto and an electric vehicle configured to implementing the same.

BACKGROUND

In general, an electric vehicle (EV) travels by wheels being driven by the driving force of a driving motor.

A high-voltage battery may be fixedly mounted on the vehicle in order to supply power to the driving motor.

The driving motor may be an AC motor, and thus, an inverter may be included between the battery and the driving motor.

If charging is required or desired according to a charging state, i.e., a state of charge (SOC), the EV battery is charged by receiving external power through an on-board charger (OBC).

The charging time may be determined according to a charging method which may be divided into a slow charging and a rapid charging.

Only one battery fixed to the EV may be insufficient, and thus, an alternative thereof is desirable.

SUMMARY

According to the present disclosure, a method for an electric vehicle, the method may comprise determining by a controller whether a second battery is electrically connected to a first battery through a connector, wherein the first battery is configured to supply power to at least one driving motor of the electric vehicle, and wherein the second battery is configured to be coupled to, or decoupled from, the first battery, determining, by the controller and based on the second battery being electrically connected to the first battery, at least one charging station associated with a destination of the electric vehicle, outputting, by the controller and via a user interface, charging planning information for charging at least one of the first battery and the second battery, wherein the charging planning information indicates the at least one charging station, outputting, by the controller, an estimated driving result for driving the electric vehicle to the destination, wherein the estimated driving result is associated with the charging planning information, and displaying, based on the estimated driving result, the user interface to receive a user input to control driving of the electric vehicle to execute a charging plan corresponding to the charging planning information.

The method further may comprise determining, based on the second battery being electrically connected to the first battery and based on states of charge of the first battery and the second battery, the at least one charging station.

The method further may comprise collecting, by the controller, information related to at least one of a state of charge (SOC) of the first battery or an SOC of the second battery, and the at least one charging station located on a route to the destination.

The outputting via the user interface further comprises outputting at least one of an estimated SOC of the first battery or an estimated SOC of the second battery at the destination.

The outputting via the user interface further comprises outputting a first charging setting interface including a first indicator, wherein the first indicator indicates charging of the first battery at the at least one charging station, and wherein the first indicator is adjustable by a user, and outputting a second charging setting interface including a second indicator, wherein the second indicator indicates charging of the first battery by the second battery in at least a partial section of the route, and wherein the second indicator is adjustable by the user.

The outputting the second charging setting interface comprises determining a section of the route which satisfies a setting condition, and outputting the second indicator for at least a part of the section satisfying the setting condition.

The setting condition comprises a condition for a section of high charging efficiency, wherein the section has a higher charging efficiency than other sections, and wherein the section of high charging efficiency comprises at least one of a flatland section or a down-hill section.

The outputting the estimated driving result comprises updating, based on an input through at least one of the first charging setting interface or the second charging setting interface, at least one of the estimated SOC of the first battery or the estimated SOC of the second battery.

The outputting via the user interface further comprises outputting a third charging setting interface including a third indicator, wherein the third indicator indicates charging the second battery at the at least one charging station, and wherein the third indicator is adjustable by the user.

The method further may comprise executing, based on an input by a user, the charging plan, wherein the user determines, based on the estimated driving result, to approve the charging plan.

According to the present disclosure, an electric vehicle may comprise at least one driving motor configured to provide a driving force to the electric vehicle, a first battery configured to supply power to the at least one driving motor, a connector configured to electrically connect the first battery to a second battery, and a controller configured to determine whether the second battery is electrically connected to the first battery through the connector, determine, based on the second battery being electrically connected to the first battery, at least one charging station associated with a route to a destination of the electric vehicle, output, via a user interface, charging planning information for charging at least one of the first battery and the second battery, wherein the charging planning information indicates the at least one charging station, output an estimated driving result for driving the electric vehicle to the destination, wherein the estimated driving result is associated with the charging planning information, and displaying, based on the estimated driving result, the user interface to receive a user input to control driving of the electric vehicle to execute a charging plan corresponding to the charging planning information.

The controller is further configured to determine, based on the second battery being electrically connected to the first battery and based on states of charge of the first battery and the second battery, the at least one charging station.

The controller is further configured to collect information related to at least one of a state of charge (SOC) of the first battery or an SOC of the second battery, and the at least one charging station located on a route to the destination.

The controller is further configured to output at least one of an estimated SOC of the first battery or an estimated SOC of the second battery at the destination.

The controller is further configured to output a first charging setting interface including a first indicator, wherein the first indicator is configured to indicate charging of the first battery at the at least one charging station, and wherein the first indicator is configured to be adjustable by a user, and output a second charging setting interface including a second indicator, wherein the second indicator is configured to indicate charging of the first battery by the second battery in at least a partial section of the route, and wherein the second indicator is configured to be adjustable by the user.

The controller is further configured to determine a section of the route which satisfies a setting condition, and output the second indicator for at least a part of the section satisfying the setting condition.

The setting condition comprises a condition for a section of high charging efficiency, wherein the section has a higher charging efficiency than other sections, and wherein the section of high charging efficiency comprises at least one of a flatland section or a down-hill section.

The controller is further configured to update, based on an input through at least one of the first charging setting interface or the second charging setting interface, at least one of the estimated SOC of the first battery or the estimated SOC of the second battery.

The controller is further configured to output a third charging setting interface including a third indicator, wherein the third indicator is configured to indicate charging of the second battery at the at least one charging station, and wherein the third indicator is configured to be adjustable by the user.

The controller is further configured to execute, based on an input by a user, the charging plan, wherein the user determines, based on the estimated driving result, to approve the charging plan.

DETAILED DESCRIPTION

Figure 1:
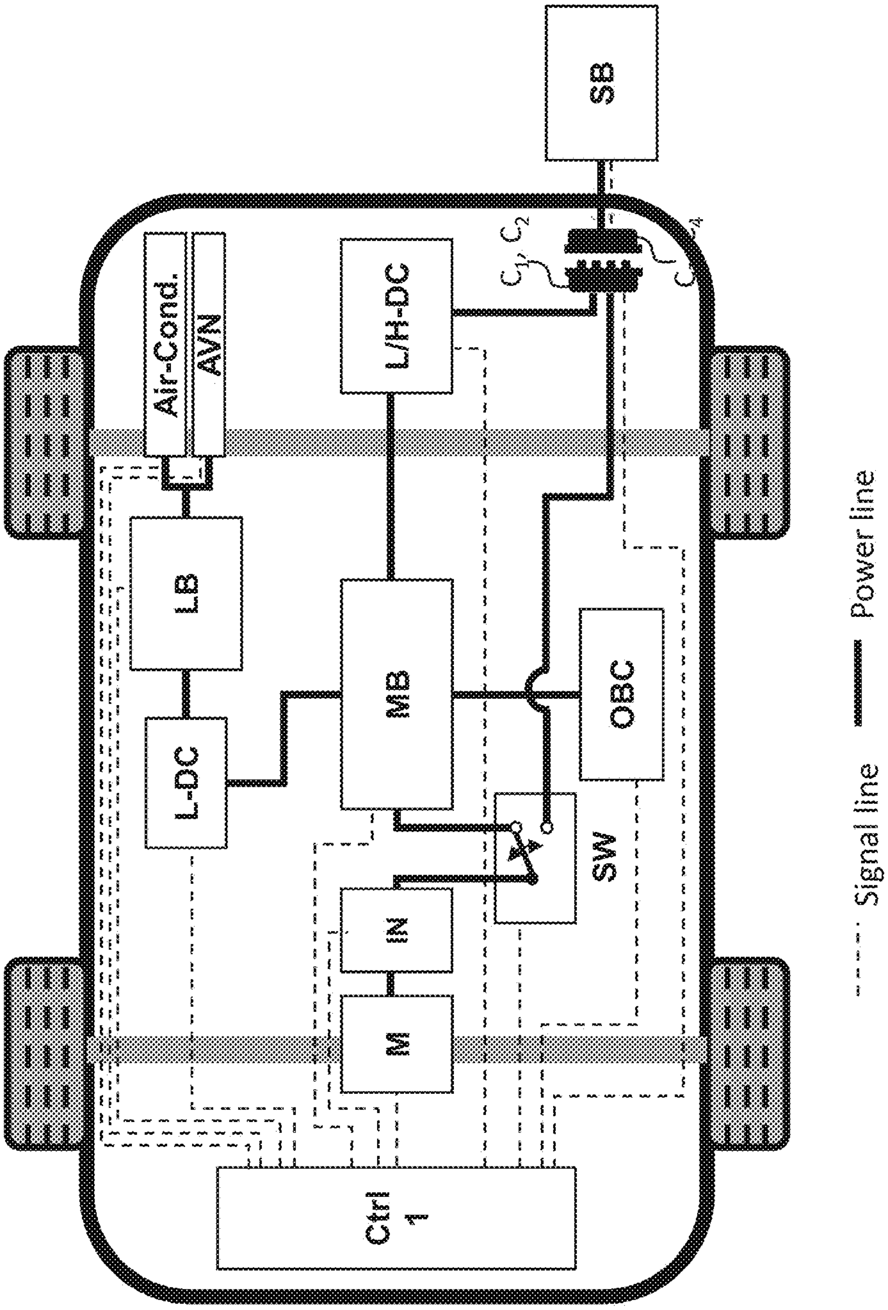
FIG. 1 shows an example of a power system of a first mobility apparatus (e.g., an electric vehicle) according to an example of the present disclosure.

Hereinafter, examples of the present disclosure will be described in detail with reference to the accompanying drawings, and the same or similar elements will be given the same reference numerals regardless of reference symbols, and repeated description thereof will be omitted.

The terms "module," "unit," and/or "and/or" for referring to elements are assigned and used interchangeably in consideration of the convenience of description, and thus the terms per se do not necessarily have different meanings or functions. The terms "module," "unit," and/or "-and/or" do not necessarily require physical separation.

Although terms including ordinal numbers, such as "first, " "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

If an element is described as "coupled" or "connected" to another element, the element may be directly coupled or connected to the other element. However, it is to be understood that another element may be present therebetween. In contrast, if an element is described as "directly coupled" or "directly connected" to another element, it is to be understood that there are no other elements therebetween.

The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary or desirable for controlling a function assigned thereto.

For example, a device under these names may include a communication device that communicates with another device or sensor to control a corresponding function, a computer-readable recording medium that stores an operating system or logic command, input/output information, etc., and one or more processors that perform determination, calculation, determination, and the like necessary or desirable for controlling a corresponding function.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, the accompanying drawings will be briefly described, and examples of the present disclosure will be described in detail with reference to the accompanying drawings.

Figure 2:
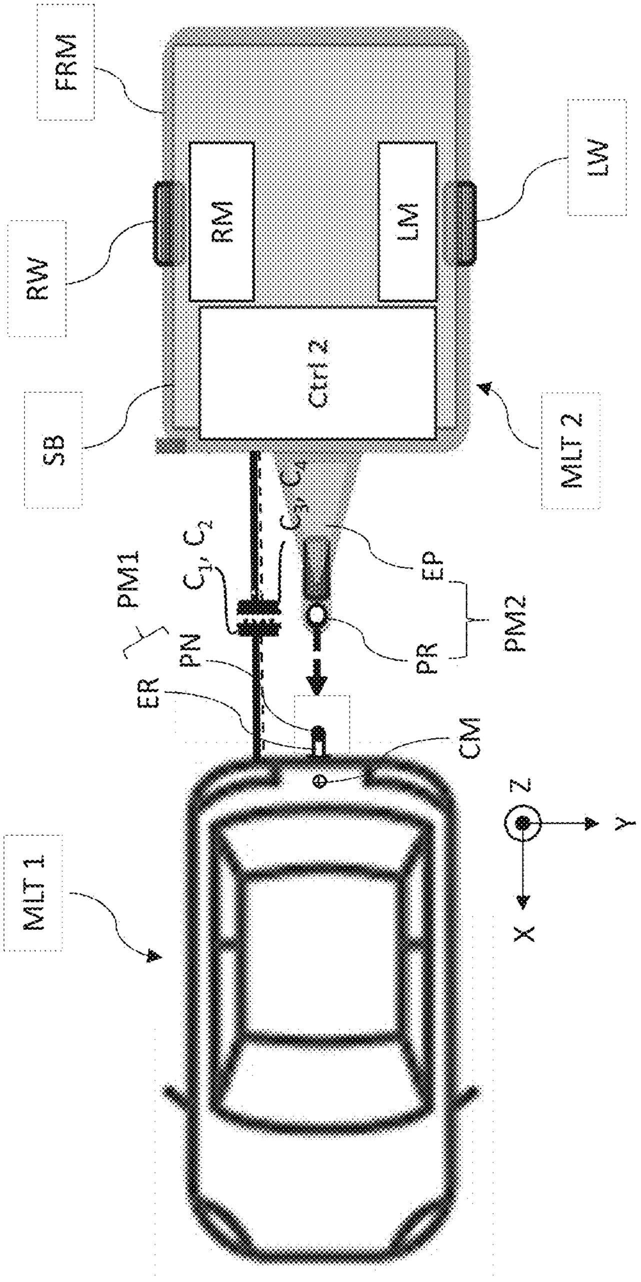
FIG. 2 shows an example of a state in which the first mobility apparatus and a second mobility apparatus (add-on mobility apparatus) are connected according to an example of the present disclosure.

FIG. 1 conceptually shows an example of a power system of the first mobility apparatus MLT1 (e.g., an electric vehicle) according to an example of the present disclosure, and FIG. 2 shows that a second mobility apparatus MLT2, which is an add-on mobility apparatus (e.g., trailer), is connected to the first mobility apparatus MLT1.

Referring to FIGS. 1 and 2, structures of the first mobility apparatus MLT1 and the second mobility apparatus MLT2 according to an example of the present disclosure will be described.

As shown in FIG. 1, the first mobility apparatus MLT1 according to an example of the present disclosure, for instance, an electric vehicle, includes a first driving motor M, an inverter IN, a main battery MB, an on-board charger OBC, the first DC/DC converter L-DC, a low voltage battery LB, an air conditioner operating at a low voltage, an audio video navigation AVN, second DC/DC converter L/H-DC, a switch SW, and a controller (hereinafter, referred to as the first controller).

The first driving motor M provides a driving force to parts (e.g., wheels, transmission, driveshaft, differential, axles, propeller shaft (for rear-wheel drive vehicles), CV joints, hub motors (in electric vehicles), the electric motor itself (in hybrids and EVs), and the chain and sprocket (in motorcycles and bicycles)) of a vehicle and may be an alternating current motor.

The inverter IN converts the DC power supplied to the first driving motor M into AC.

The main battery (MB) (first high-voltage battery) is a high-voltage battery and may be fixedly installed on a vehicle under the floor of a room.

The main function of the main battery MB is to supply electric power to the first driving motor M and may be charged with an on-board charger OBC.

In addition, the main battery MB may be connected to the low-voltage battery LB through the first DC/DC converter L-DC to charge the low-voltage battery LB.

In order to charge the low-voltage battery LB, the first DC/DC converter L-DC may be a low-voltage DC-DC converter LDC.

The low-voltage battery LB may be, for example, a battery of 12 V or 24 V, and supplies electric power to electric devices in the vehicle such as an air conditioner, an AVN, etc., which operate at a low voltage.

The swappable battery SB (second high-voltage battery) as shown in FIG. 1 is a high-voltage battery and may be installed in the second mobility apparatus MLT2 to be described later.

The swappable batteries SB may be electrically connected to the vehicle power system while detachable including the main battery MB in addition to, i.e., without it, in a way that has no effect on the operation of the power system (supply of power to vehicle electronics, driving motors, etc.) by a wired manner (or a wireless manner within a possible range).

Although the swappable battery SB may be referred to as an auxiliary battery, an extended battery, a secondary battery, or a secondary battery, but these are only for distinguishing from the main battery MB. That is, the swappable battery SB is not limited to any one of a function, a feature, a mechanical/electrical/chemical structure according to a relationship with another object (including a main battery (MB), a host vehicle, etc.), a battery type (including a packaging method, a type of material such as cathode/anode/separator, etc.) (e.g., lead-acid, lithium-ion, nickel-cadmium, nickel-metal hydride, alkaline batteries, and solid-state batteries, etc.), a type of charging (e.g., Level 1 charging utilizes standard household outlets for slow charging, Level 2 charging, requiring a higher voltage supply, for faster charging times, DC fast charging, Wireless charging allowing EVs to charge without cables, or battery swapping involves exchanging a depleted battery with a fully charged one, etc.), etc.

The swappable battery SB may be connected to the first controller Ctrl 1 of the first mobility apparatus MLT 1, which is the host vehicle, or a later described battery management system (BMS) of the main battery MB in a wired or wireless communication, whereby various sensing information (e.g., voltage, current, temperature, etc.) related to the SOC state and the physical/electrical/chemical state of the swappable battery SB are transmitted to the first controller Ctrl 1. However, the present disclosure is not limited thereto, and the information related to the swappable battery SB may be transmitted to the first controller Ctrl 1 through the second controller Ctrl 2 of the later described second mobility apparatus MLT 2.

In the present example, the high voltage battery applied to the main battery MB and the swappable battery SB may include a plurality of battery cells (not shown) that output a voltage, e.g., within 2.7 to 4.2 V, and the plurality of battery cells may be connected to each other in series/parallel by a set number to form one module.

The high voltage battery of the main battery MB and the swappable battery SB may include a battery management system BMS.

The BMS may include a battery management unit BMU, a cell monitoring unit CMU, and a battery junction box BJB.

The BMS performs a cell balancing function for maintaining a constant voltage of each cell to assure the performance of the entire battery pack, a state of charge (SOC) function for calculating the capacity of the entire battery system, battery cooling, charging, discharging control, etc.

The BMU receives information of all cells from the CMU and performs a function of the BMS based on the received information.

The BMU may comprise two micro control units MCU, and each MCU has one CAN communication port. A CAN interface may be included to communicate with a vehicle controller (i.e., the first controller) that may be referred to as an upper device of the BMS, and the CAN interface may be included to collect information of the CMU that is a lower device.

The CMU may be directly attached to the battery cell to sense voltage, current, temperature, etc. The CMU does not perform calculations related to the BMS algorithm and is simply limited to the role of sensing. A plurality of battery cells may be connected to one CMU, and information about each cell is transmitted to the BMU through a CAN interface.

The BJB is a pack-level sensing mechanism of the BMS and a connection medium between the high-voltage battery and a drive train. The battery voltage and the current flowing in-and-out of the battery are measured and recorded so that the SOC may be accurately calculated. In addition, the BJB may perform safety-critical functions such as insulation monitoring as well as overcurrent sensing.

The swappable battery SB may be a high-voltage battery having a lower voltage than the main battery MB, and in this case, the second DC/DC converter L/H-DC may be a boost DC/DC converter. Reversely, the swappable battery SB may also be a high voltage battery having a higher voltage than the main battery MB, and in this case, the second DC/DC converter L/H-DC may be a low-voltage DC/DC converter.

In the present example, the second DC/DC converter L/H-DC in the power system is included as a built-in in the first mobility apparatus MLT1, but it is not limited thereto. Unlike the present example, the second DC/DC converter L/H-DC may be provided as a separate component and may be connected to the power system while also detachable.

In the present example, in order to electrically connect while detachable to the power system of the swappable battery SB, the power system of the first mobility apparatus MLT1 may include the first and second connectors C1, C2, and the swappable battery SB may include the third and fourth connectors C3, C4.

For example, the first and second connectors C1 and C2 may be integrated into one connector, and the third and fourth connectors C3 and C4 may also be integrated into one connector.

The first connector C1 is connected to the second DC/DC converter L/H-DC, and the second connector C2 is connected to the switch SW.

Meanwhile, although not shown, a connector for signal transmission may be added to transmit various sensing and state information of the swappable battery SB to the controller.

The switch SW is electrically connected to the inverter IN fixed and is switched between the main battery MB and the second connector C2 to electrically connect the inverter IN and the main battery MB or to electrically connect the inverter IN and the swappable battery SB.

In the present example, the first controller Ctrl 1 may be the uppermost vehicle controller that controls all or some electrical devices of the first mobility apparatus MLT 1, but it is not limited thereto. That is, for example, the first controller Ctrl 1 of FIG. 1 may be a power controller below the vehicle controller.

In addition, in the present example, the first controller Ctrl 1 may include a computer-readable recording medium storing an operating system or a logic command and input/output information, and one or more processors reading the operating system or the logic command and the input/output information and performing determination, operation, determination, and the like necessary or desirable for controlling functions of the computer-readable recording medium.

Meanwhile, the main battery MB is connected to the inverter IN through the switch SW, but the present example is not limited thereto, and the main battery MB may be directly connected to the inverter IN without the switch SW. In this case, the second connector and the fourth connector of the swappable battery SB may not be necessary or desirable.

The swappable battery SB shown in FIG. 1 may be installed in the second mobility apparatus MLT2 (e.g., trailer) as shown in FIG. 2.

The second mobility apparatus MLT2 includes a frame FRM, the second left wheel LW installed at the left side of the frame FRM, the second right wheel RW installed at the right side of the frame FRM, the second left driving motor LM for providing driving force to the second left wheel LW, the second right driving motor RM for providing driving force to the second right wheel RW, and the second controller Ctrl 2.

The swappable battery SB may be fixed to the second mobility apparatus MLT2, but it is not limited thereto. That is, the swappable battery SB may be installed while detachable on the second mobility apparatus MLT2. Accordingly, the swappable battery SB in which the SOC mounted on the frame FRM is completely discharged may be removed, and the swappable battery SB in which the SOC is fully charged may be replaced.

If the swappable battery SB is fixed to the second mobility apparatus MLT2, the second mobility apparatus MLT2 may include a charging connector for charging the swappable battery SB.

The frame FRM forms an appearance of the second mobility apparatus MLT2 and serves to accommodate other components.

The frame FRM includes the second pivot mechanism PM2 as the second connection mechanism, and the second pivot mechanism PM2 may be pivotally connected while detachable to the first pivot mechanism PM1, which is the first connection mechanism fixed to the vehicle body of the first mobility apparatus MLT1.

Illustratively, the first pivot mechanism PM1 includes an extension road ER extending behind from the vehicle body of the first mobility apparatus MLT1 and a pivot pin PN protruding upward from the end of the extension road ER.

Also, the second pivot mechanism PM2 includes a triangular extension EP protruding forward from the frame FRM of the second mobility apparatus MLT2 and a pivot ring PR into which the pivot pin PN may be inserted to rotation at the end of the extension EP.

According to the present disclosure, the pivot pin PN is restricted from moving straight while being inserted into the pivot ring PR and may only rotate in the Z-axis direction (e.g., a direction perpendicular to a moving direction of a vehicle) of FIG. 2. Thus, the second mobility apparatus MLT2, with respect to the first mobility apparatus MLT1 connected from the pivot state, may only rotate from the center of the Z-axis restraining a straight motion from the center of the pivot connection point thereof.

If the vehicle travels in the forward direction, i.e., the X-axis direction, straightness of the first mobility apparatus MLT1 and the second mobility apparatus MLT2 may be maintained without a separate steering control for the second mobility apparatus MLT2.

In the present example, the first and second connection mechanisms include a pivot mechanism, but they are not limited thereto. For example, the first and second connection mechanisms may be known mechanisms for implementing a non-rotational connection with respect to the Z-axis.

A rotation shaft of the second left driving motor LM is connected to the second left wheel LW, and thus the second left driving motor LM provides driving force to the second left wheel LW.

In addition, the rotation shaft of the second right driving motor RM is connected to the second right wheel RW, and thus the second right driving motor RM provides a driving force to the second right wheel RW.

Since the second left wheel LW and the second right wheel RW are respectively connected to the second left driving motor LM and the second right driving motor RM, they are driven independently from each other.

The second left driving motor LM and the second right driving motor RM may be driven in the forward direction and the reverse direction, respectively, and if they are driven in the forward direction, the second mobility apparatus MLT2 is driven in the forward direction, and if they are driven in the reverse direction, they are driven in the reverse direction.

For example, each of the second left driving motor LM and the second right driving motor RM may be implemented as an in-wheel driving system in which a driving motor is installed in wheels, but they are not limited thereto.

Further, unlike the present example, the left and right sides of the second mobility apparatus MLT2 are not independent from each other, but the driving of one common motor may be allocated and transmitted to the second left wheel LW and the second right wheel RW. To this end, a differential gear may be included between the common second driving motor and the second left wheel LW and the second right wheel RW. That is, the power of the common second driving motor may be allocated by the differential gear and transmitted to the second left wheel LW and the second right wheel RW. In this case, a torque vectoring means may be added for torque distribution between the second left wheel LW and the second right wheel RW.

In FIG. 2, the second controller Ctrl 2 controls the second left driving motor LM and the second right driving motor RM to achieve the driving of the second mobility apparatus MLT 2. In addition, if steering of the second mobility apparatus MLT2 is required or desired, the second controller Ctrl 2 changes the traveling direction (e.g., X-axis direction) of the second mobility apparatus MLT2 through control of each torque of the second left driving motor LM and the second right driving motor RM or the number of revolutions thereof. That is, the steering of the second mobility apparatus MLT2 is achieved without a separate steering device through independent control of the driving of the second left driving motor LM and the second right driving motor RM.

Also, as described above, a wired or wireless communication means for transferring information between the connectors of FIG. 1 and the first mobility apparatus MLT1 and the second mobility apparatus MLT2 is included.

Meanwhile, in the present example, the first controller Ctrl 1 or the second controller Ctrl 2 includes a memory and a processor. The memory stores computer instructions for performing the function of the corresponding controller, and the processor performs the function by retrieving and executing the instructions from the memory.

The memory may include at least one of a hard disk drive HDD, a solid-state drive SDD, a silicon disk drive SDD) a ROM, a RAM, a CD-ROM, a magnetic tape, a floppy disk, or an optical data storage device.

The processor may include at least one of a computer, a microprocessor, a central processing unit CPU, an ASIC, an electric circuit, or a logic circuit.

As the first connector C1 and the second connector C2 of the first mobility apparatus MLT1 are connected to the third connector C3 and the fourth connector C4 of the second mobility apparatus MLT2 and the signal transfer connector is connected, the first mobility apparatus MLT1 and the second mobility apparatus MLT2, in other words, the first controller Ctrl 1 and the second controller Ctrl 2 are in a state of being able to communicate with each other.

If the first mobility apparatus MLT1 starts driving forward in a state in which the first mobility apparatus MLT1 and the second mobility apparatus MLT2 are mechanically and electrically connected to each other, the second controller Ctrl 2 controls the second left driving motor LM and the second right driving motor RM to perform forward straight driving of the second mobility apparatus MLT2 according to a signal transmitted from the first connector C1 at the traveling speed.

At this time, some or all of a speed, a gear position, a steering angle, accelerator pedal sensor (APS) information, and brake pedal sensor (BPS) information of the first mobility apparatus MLT1 may be transmitted to the second mobility apparatus MLT2.

The second controller (Ctrl 2) of the second mobility apparatus MLT2 determines whether the first mobility apparatus MLT1 is in a forward driving state or in a reversed driving state by using some or all of the speed, the gear position, APS information, and BPS information of the first mobility apparatus MLT1. However, the present disclosure is not limited thereto, and the information on whether the vehicle is in the forward driving state or in the reversed driving state may be directly received from the first controller Ctrl 1.

If the first mobility apparatus MLT1 is driving forward, the second controller Ctrl 2 drives the second left driving motor LM and the second right driving motor RM in the forward direction to perform forward straight driving of the second mobility apparatus MLT2. In addition, if the first mobility apparatus MLT1 is driving reversed, the second controller Ctrl 2 drives the second left driving motor LM and the second right driving motor RM in the reverse direction to perform reverse driving of the second mobility apparatus MLT2.

In addition, the second controller Ctrl 2 determines the steering state through the steering angle information of the first mobility apparatus MLT 1, and accordingly, the second mobility apparatus MLT 2 performs steering.

The second mobility apparatus MLT2 does not include a separate steering device such as a steering wheel, a steering rack, or the like, and achieves steering through torque control of the second left driving motor LM and the second right driving motor RM.

That is, the second controller Ctrl 2 calculates a driving torque for driving and a steering torque for steering with respect to each of the second left driving motor LM and the second right driving motor RM and uses the driving torque and the steering torque for control.

For example, in order to achieve steering of the second mobility apparatus MLT2, steering torque values of the second left driving motor LM and the second right driving motor RM according to a steering angle of the first mobility apparatus MLT1 are included in a lookup table or a calculation program.

During forward straight driving, the speed of the second mobility apparatus MLT2 is controlled not to be greater than the first mobility apparatus MLT1. Accordingly, the pivot connection between the first mobility apparatus MLT1 and the second mobility apparatus MLT2 is maintained within a determined pivot angle range. For example, if the speed of the second mobility apparatus MLT2 is controlled not to be greater than the first mobility apparatus MLT1 during forward straight driving, the pivot angle of the second mobility apparatus with respect to the first mobility apparatus MLT1 at the pivot connection point is maintained to a 0 degree (which means an angle at which the first mobility apparatus MLT1 and the second mobility apparatus MLT2 become a straight line) or substantially 0 degree (e.g., +0.05 degrees).

In the forward driving, the second mobility apparatus MLT2 is controlled to follow the first mobility apparatus MLT1, and thus smooth connection driving of a plurality of mobilities is achieved.

Figure 3:
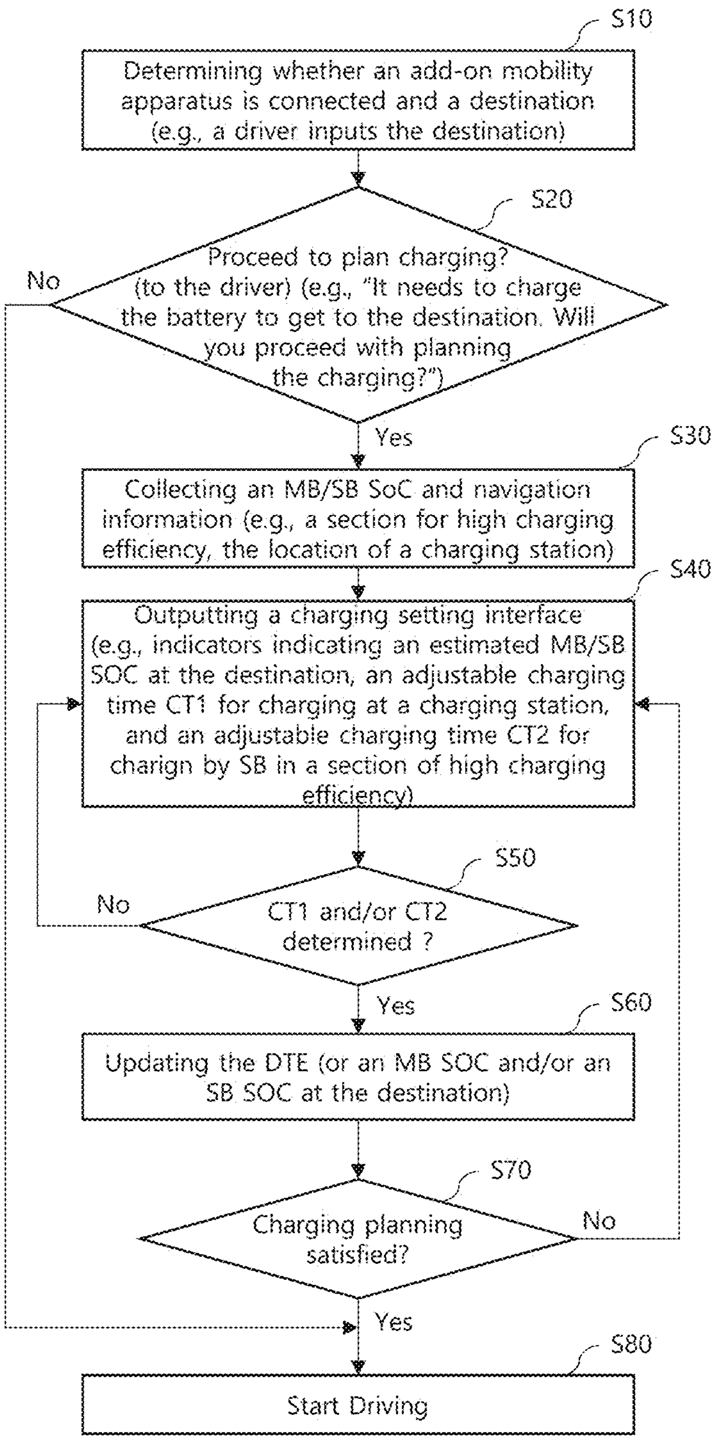
FIG. 3 shows an example of a control and a process in which charging planning is performed by the first controller of the first mobility apparatus.

Hereinafter, the charging control method by the first controller Ctrl 1 will be described in detail with reference to FIG. 3.

First, in S10, the first controller Ctrl 1 confirms connection of the second mobility apparatus MLT 2 and determines a destination.

The connection of the second mobility apparatus MLT2 may be verified by transmitting a signal from the first mobility apparatus MLT1 to the first controller Ctrl 1 according to the connection between the first connector C1 and the third connector C3, the connection between the second connector C2 and the fourth connector C4, and the connection of the connector for signal transmission, and it may be verified that the second mobility apparatus MLT2 is connected through the signal.

In addition, the user may input the destination through the AVN screen to use navigation of the AVN, and the first controller Ctrl 1 may receive the information and determine the destination in S10.

In S20, the first controller Ctrl 1 may receive a user selection on whether to perform charging planning through the user interface through the AVN screen.

If the charging planning is input in S20, the first controller Ctrl 1 may collect the SOC of the main battery MB and/or the SOC of the swappable battery SB and the navigation information in S30.

The navigation information may include information on a section and a charging station that meet a setting condition in a navigation route from a starting point or a current location to the destination.

Here, the setting condition may include a condition for a section for outstanding charging efficiency.

If the main battery MB is charged with the swappable battery SB, and if the load applied to the second DC/DC converter L/H-DC or the main battery MB is low, the charging efficiency is good. For example, if the vehicle is stopped, a section in which the vehicle travels on a flatland at a constant speed, on a down-hill section (in which main battery (M) charging may be performed through regenerative braking), and the like may correspond thereto.

In addition, the charging station information may include quick charger information or slow charger information as charger information including a location of a charging station and power information that may be charged per hour or minute.

Next, the first controller Ctrl 1 may output a user interface for the charging setting in S40. Here, the user interface may be output through an AVN screen.

Figure 4:
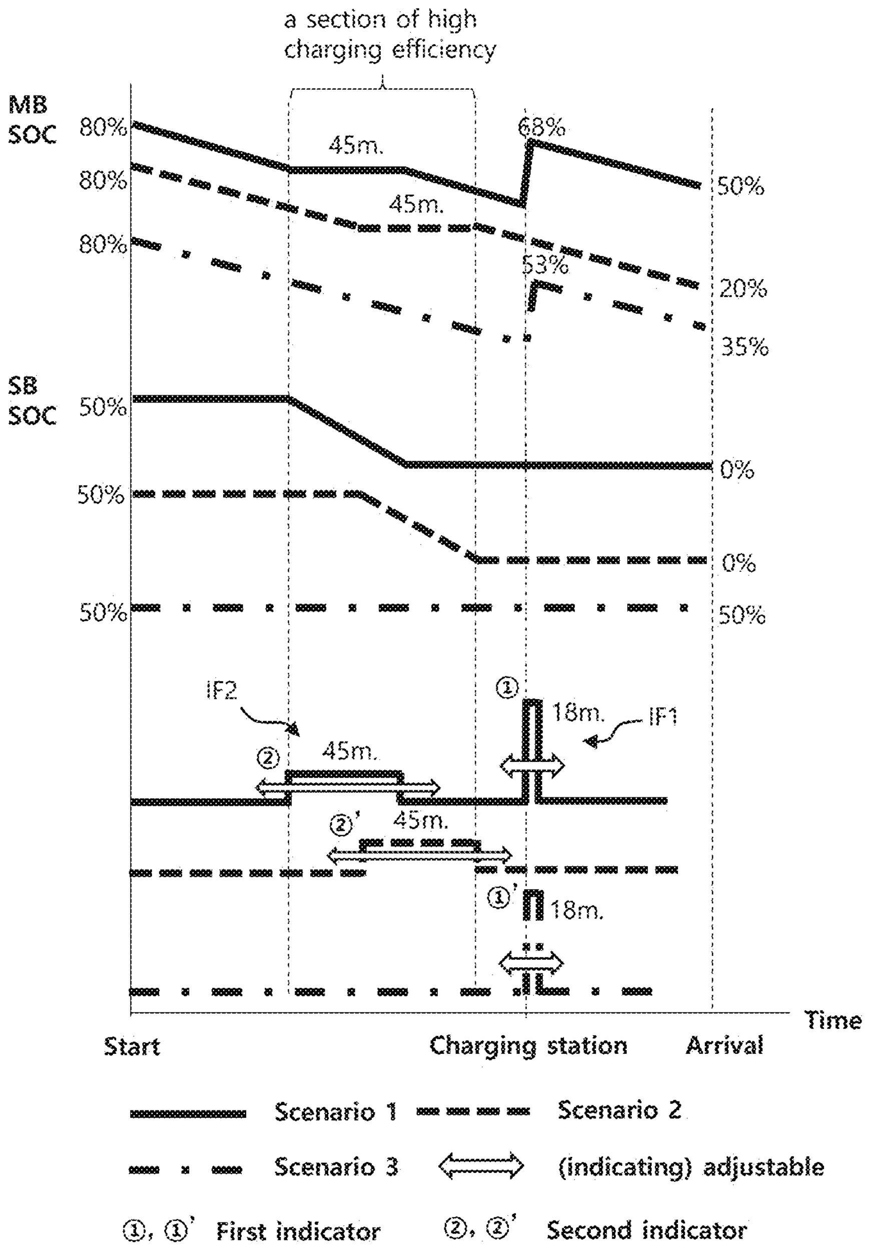
FIGS. 4, 5, and 6 show an example of a user interface according to an example of the present disclosure.

FIG. 4 shows an example of a charging setting user interface screen for three scenarios, which will be described in detail.

First, as shown in FIG. 4, the first controller Ctrl 1 may output or display the current SOC of the main battery MB and the SOC state to the destination (the above image of FIG. 4) and the current SOC of the equation battery SB and the SOC state to the destination (the middle image of FIG. 4) through the AVN screen.

In addition, the first controller Ctrl 1 may output or display the first charging setting interface IF1 and a second charging setting interface IF2 in order to receive input or adjustment of the charging setting by the user (a below image of FIG. 4).

The first charging setting interface IF1 includes the first indicator that indicates the charging of the main battery MB to at least one charging station, and the second charging setting interface IF2 includes the second indicator that indicates the charging of the main battery MB with the swappable battery SB in at least some sections of the route to the destination.

The first indicator and the second indicator may respectively display charging time as an example.

Referring to FIG. 4, the user may adjust the charging time at the charging station by adjusting the first indicator of the first charging setting interface IF1 and may also adjust the charging time of the main battery MB by the swappable battery SB by adjusting (e.g., graphically via a graphic user interface or a control knob) the second indicator of the second charging setting interface IF2.

In an example, the first charging setting interface IF1 and the second charging setting interface IF2 may be a touch screen type interface implemented through an AVN screen. That is, the user may touch the first indicator or the second indicator output on the AVN screen by hand and change the charging time thereof.

Figure 5:
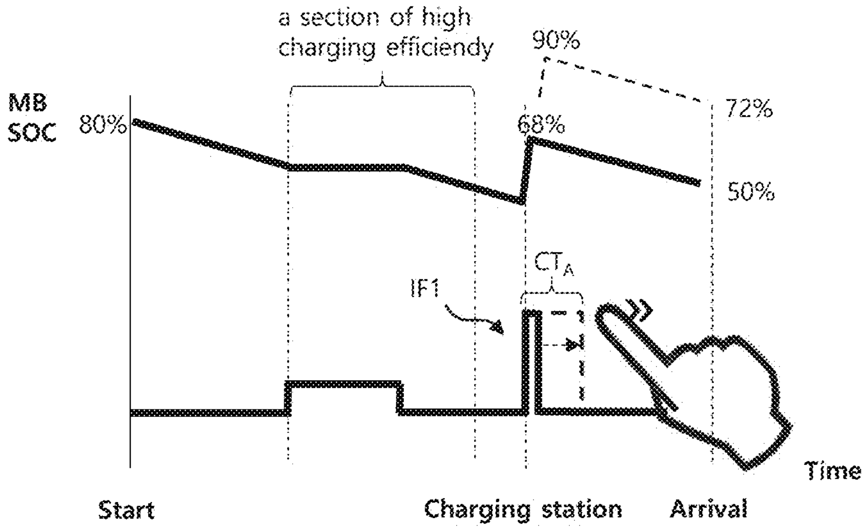

FIG. 5 shows an example of an adjusting the charging time at the charging station through the first charging setting interface IF1 for scenario 1 of FIG. 4.

As shown in FIG. 5, the first charging setting interface IF1 may be touched and dragged to the right, thereby adjusting the charging time to the CTA.

Although not shown in FIG. 5, the user similarly may adjust the charging time by touching and dragging the second charging setting interface IF2 with his or her hand.

Referring back to FIG. 4, the user interface for each scenario will be described as follows.

In Scenario 1, charging is performed for 45 minutes at the initial section for outstanding charging efficiency, and charging of the main battery MB is performed for 18 minutes at the charging station.

In this case, the SOC of the main battery MB, according to the driving of the electric vehicle until the destination is decreased from the initial 80%, constantly maintains as is charged by charging the swappable battery SB for 45 minutes at the section for outstanding charging efficiency, increases to 68% as charged at the charging station for 18 minutes after decreasing again until the charging station, and then reaches 50% to the destination.

In addition, the estimated SOC of the swappable battery SB is constantly maintained at the initial 50% and is reduced to 0% as the main battery MB is charged.

Next, Scenario 2 is a case where charging is performed for 45 minutes until the SOC of the swappable battery SB reaches 0% at the later part of the section for outstanding charging efficiency, and there is no charging for the main battery MB at the charging station.

In this case, the estimated SOC of the main battery MB decreases from the initial 80%, maintains as is by charging the swappable battery SB for 45 minutes at the later part of the section for outstanding charging efficiency, and then reaches 20% at the destination without additional charging at the charging station.

Scenario 3 is a case in which only charging is performed for 18 minutes at a charging station without charging with a swappable battery SB.

In this case, the estimated SOC of the main battery MB decreases from the initial 80%, rises to 53% with 18 minutes of charging at the charging station, and then reaches 35% at the destination.

Momentarily, the SOC of the swappable battery SB at an initial 50% is maintained until the destination since the swappable battery SB is not charged with the main battery MB while driving.

Here, the first controller Ctrl 1, as an example, may calculate an estimated load added to the driving motor in considering the road slope for each section with respect to the navigation route in order to calculate the estimated SOC of the main battery MB. In this case, vehicle speed of each section may be vehicle speed limit information of a road in the corresponding section. The calculation of the estimated load may be performed with a well-known method, and thus further description thereof will be omitted.

The estimated SOC of the main battery MB may calculate from energy consumed according to the estimated load if the vehicle travels to the destination and may output to the user interface as shown in FIG. 4.

In order to calculate and output the initial estimated SOC in the user interface of FIG. 4, the first controller Ctrl 1 may set the charging time of the first indicator and the charging time of the second indicator as default.

For example, as shown in FIG. 4, the charging time of the first indicator may be set to 18 minutes, and the charging time of the second indicator may be set to 45 minutes or 60-30 minutes by default.

However, the present example is not limited thereto, and the first charging setting interface IF1 and the second charging setting interface IF2 may be output on the screen without output from the initial estimated SOC, and if the charging time of the first indicator and the charging time of the second indicator are input by the user, the estimated SOC calculated according to the charging time may be output on the screen.

That is, in a state in which only the first charging setting interface IF1 and the second charging setting interface IF2 at the lower end are output on the screen in FIG. 4, if the charging times are input by the user, it is possible that the illustrative drawing in which the estimated SOC such as the upper end and middle image of FIG. 4 may be the output.

In addition, although FIG. 4 is presented as a form of a graph, the present disclosure is not necessarily limited thereto, and the estimated SOC may be displayed in numbers, images, or characters for each section, and the first charging setting interface IF1 and the second charging setting interface IF2 may also use numbers, images, or characters as input.

Meanwhile, although only the charging setting interfaces IF1 and IF2 for the main battery MB are shown in FIG. 4, the charging setting interface for the swappable battery SB may be added.

Figure 6:
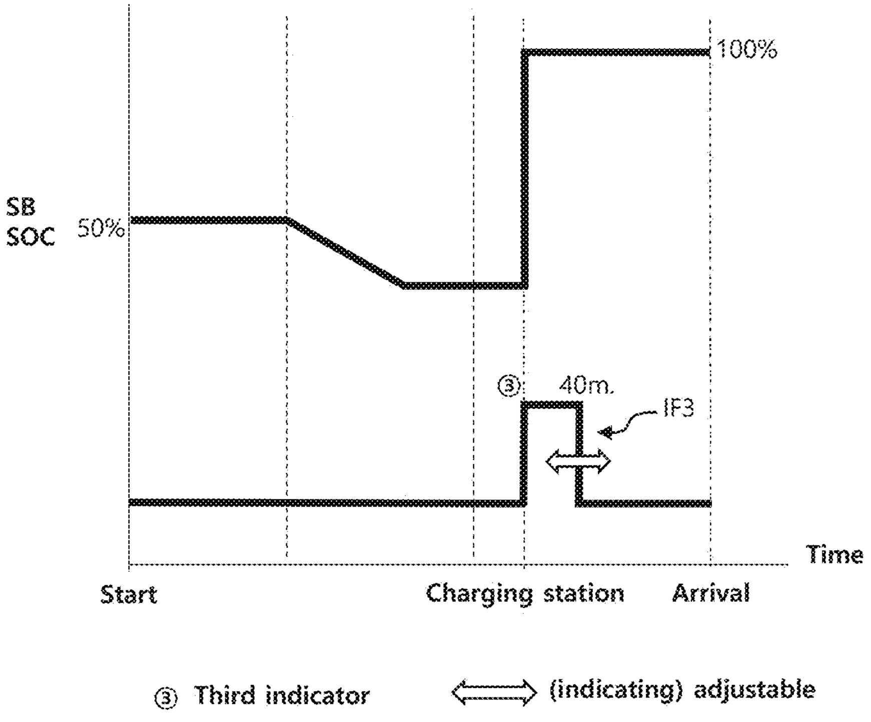

For example, as shown in FIG. 6, the third charging setting interface IF3 may be added in the same manner as the first charging setting interface IF1.

That is, the third indicator for the charging time at the charging station for the swappable battery SB in FIG. 6 may be output on the AVN screen. Likewise, the user may adjust the charging time of the third indicator by touching and dragging with a hand.

Referring back to FIG. 3, if the charging time at the charging station and the charging time by the swappable battery SB are selected by the user as in S40 and determined as in S50, the first controller Ctrl 1 may update the estimated SOC of the main battery MB and the estimated SOC of the swappable battery SB according to the determination in S60.

For example, FIG. 5 shows that the estimated SOC of the main battery MB changes as the charging time at the charging station for scenario 1 of FIG. 4 is changed by the user.

As shown in FIG. 5, depending on the charging time at the charging station is changed from 18 minutes to the CTA through the first charging setting interface IF1, the SOC of the main battery MB is increased from 68% to 90% through the charging station charging and becomes 72% at the destination.

Accordingly, the user may plan a desired charging time through a preferred change in SOC according to the adjustment of the charging time. For example, demanding for the SOC of the main battery MB to be at 50% at the destination, the charging time at the charging station may be maintained to 18 minutes, while demanding for the SOC of the main battery MB to be more than 50%, the charging time thereof may be adjusted until the desired destination SOC is reached.

The adjustment of each charging time through the first charging setting interface IF1 and the second charging setting interface IF2 may be reflected in real time in regards to the estimated SOC output of the main battery MB and the swappable battery SB, thereby promoting user convenience.

Meanwhile, in the case of outputting the estimating driving result until the destination, a distance to empty DTE by the main battery MB and/or the swappable battery SB may be provided in addition to or in replacement to the estimated SOC. The user may determine whether the charging planning is satisfied by comparing the driving distance to the destination.

In S70, if the user inputs whether the charging planning is satisfied through the screen, the charging planning is affirmed, and the first controller Ctrl 1 starts driving and controls charging according to the driving (S80).

An example of the present disclosure aims to alleviate or solve the above-described conventional problems.

The example of the present disclosure proposes a new concept technology using a battery (hereinafter, referred to as a "swappable battery" to differentiate from a main battery) that may be added to and separated from a power system of an electric vehicle, if necessary or desirable, in addition to a battery (hereinafter, referred to as a "main battery" for convenience of description) pre-installed in the electric vehicle.

Another example of the present disclosure is to provide a method for planning charging an electric vehicle with an add-on mobility apparatus comprising a swappable battery connected thereto with a user's convenience and a charging control method thereof, and an electric vehicle implementing the same.

Examples of the present disclosure are directed to a method for controlling charging an electric vehicle, which comprises a plurality of first wheels, at least one first driving motor for providing a driving force to the plurality of first wheels, a first high-voltage battery for supplying power to the at least one first driving motor, at least one electric device operated at a low voltage, a low-voltage battery for supplying power to the at least one electric device, a first DC/DC converter connected between the first high-voltage battery and the low-voltage battery, a second DC/DC converter connected to the first high-voltage battery, a first connector connected to the second DC/DC converter, and a first controller, wherein the method includes determining whether a second high-voltage battery of an add-on mobility apparatus is electrically connected to the first high-voltage battery through the first connector, determining a destination, outputting a user interface for setting a charging planning for charging the first high-voltage battery by a charger of a charging station and with the second high-voltage battery, and outputting an estimated driving result for driving to the destination according to the charging planning.

In at least one example of the present disclosure, the method further includes collecting, by the first controller, information related to an SOC of the first high-voltage battery and/or an SOC the second high-voltage battery and at least one charging station located on a route to the destination In at least one example of the present disclosure, the outputting the user interface includes outputting an estimated SOC of the first high-voltage battery and/or an estimated SOC of the second high-voltage battery at the destination.

In at least one example of the present disclosure, the outputting the user interface further includes outputting a first charging setting interface including a first indicator indicating charging of the first high-voltage battery at the at least one charging station and adjustable by a user, and outputting a second charging setting interface including a second indicator indicating charging of the first high-voltage battery by the second high-voltage battery in at least a partial section of the route and adjustable by the user.

In at least one example of the present disclosure, the outputting the second charging setting interface includes determining a section of the route which satisfies a setting condition, and outputting the second indicator for at least a part of the section satisfying the setting condition.

In at least one example of the present disclosure, the setting condition includes a condition for a section of high charging efficiency.

In at least one example of the present disclosure, the section of high charging efficiency includes a flatland section and/or a down-hill section.

In at least one example of the present disclosure, the outputting the estimated driving result includes updating the estimated SOC of the first high-voltage battery and/or the estimated SOC of the second high-voltage battery according to an input through the first charging setting interface and/or the second charging setting interface.

In at least one example of the present disclosure, the outputting the user interface comprises outputting a third charging setting interface including a third indicator indicating charging the second high-voltage battery at the at least one charging station and adjustable by the user.

In at least one example of the present disclosure, the method further includes executing the charging planning in response to an approval for the estimated driving result being input by a user.

Also, many examples of the present disclosure are directed to an electric vehicle comprising a plurality of first wheels, at least one first driving motor for providing a driving force to the plurality of first wheels, a first high-voltage battery for supplying power to the at least one first driving motor, at least one electric device operated at a low voltage, a low-voltage battery for supplying power to the at least one electric device, a first DC/DC converter connected between the first high-voltage battery and the low voltage battery, a second DC/DC converter connected to the first high-voltage battery, a first connector connected to the second DC/DC converter, and a first controller, wherein the first controller is configured to check whether the second high-voltage battery of an add-on mobility apparatus is electrically connected to the first high-voltage battery through the first connector, determine a destination, output a user interface for setting a charging planning for charging the first high-voltage battery by a charger of a charging station and the second high-voltage battery, and output an estimated driving result for driving to the destination according to the charging planning.

In the electric vehicle according to at least one example of the present disclosure, the first controller is further configured to collect information related to an SOC of the first high-voltage battery and/or an SOC of the second high-voltage battery and at least one charging station located on a route to the destination.

In the electric vehicle according to at least one example of the present disclosure, the first controller is further configured to output an estimated SOC of the first high-voltage battery and/or an estimated SOC of the second high-voltage battery at the destination.

In the electric vehicle according to at least one example of the present disclosure, the first controller is further configured to output a first charging setting interface including a first indicator indicating charging of the first high-voltage battery at the at least one charging station and adjustable by the user, and output a second charging setting interface including a second indicator indicating charging of the first high-voltage battery by the second high-voltage battery and adjustable by the user in at least a partial sections of the route.

In the electric vehicle according to at least one example of the present disclosure, the first controller is further configured to determine a section of the route which satisfies a setting condition, and output the second indicator for at least a part of the section satisfying the setting condition.

In the electric vehicle according to at least one example of the present disclosure, the setting condition includes a condition for a section of high charging efficiency.

In the electric vehicle according to at least one example of the present disclosure, the section of high charging efficiency includes a flatland section and/or a down-hill section.

In the electric vehicle according to at least one example of the present disclosure, the first controller is further configured to update the estimated SOC of the first high-voltage battery and/or the estimated SOC of the second high-voltage battery according to an input through the first charging setting interface and/or the second charging setting interface.

In the electric vehicle according to at least one example of the present disclosure, the first controller is further configured to output a third charge setting interface including a third indicator indicating charging of the second high-voltage battery at the at least one charging station and adjustable by the user.

In the electric vehicle according to at least one example of the present disclosure, the first controller is further configured to execute the charging planning in response to an approval for the estimated driving result being input by user.

Due to the swappable battery, the mileage per one charge of the electric vehicle may increase.

When charging the main battery with the swappable battery, the charging may be performed in a section of high charging efficiency, thereby the energy efficiency is improved. Also, a user may plan for charging the vehicle such that the SOC of the main battery or the swappable battery becomes a required or desired level at the destination.

What is claimed is:

1. A method for an electric vehicle the method comprising:

determining, by a controller, whether a second battery is electrically connected to a first battery through a connector, wherein the first battery is configured to supply power to at least one driving motor of the electric vehicle, and wherein the second battery is configured to be coupled to, or decoupled from, the first battery;

determining, by the controller and based on the second battery being electrically connected to the first battery, at least one charging station associated with a destination of the electric vehicle;

outputting, by the controller and via a user interface, charging planning information for charging at least one of the first battery and the second battery, wherein the charging planning information indicates the at least one charging station;

outputting, by the controller, an estimated driving result for driving the electric vehicle to the destination, wherein the estimated driving result is associated with the charging planning information; and displaying, based on the estimated driving result, the user interface to receive a user input to control driving of the electric vehicle to execute a charging plan corresponding to the charging planning information.

2. The method of claim 1, further comprising determining, based on the second battery being electrically connected to the first battery and based on states of charge of the first battery and the second battery, the at least one charging station.

3. The method of claim 1, further comprising collecting, by the controller, information related to:

at least one of a state of charge (SOC) of the first battery or an SOC of the second battery; and the at least one charging station located on a route to the destination.

4. The method of claim 3, wherein the outputting via the user interface further comprises outputting at least one of an estimated SOC of the first battery or an estimated SOC of the second battery at the destination.

5. The method of claim 4, wherein the outputting via the user interface further comprise:

outputting a first charging setting interface including a first indicator, wherein the first indicator indicates charging of the first battery at the at least one charging station, and wherein the first indicator is adjustable by a user, and outputting a second charging setting interface including a second indicator, wherein the second indicator indicates charging of the first battery by the second battery in at least a partial section of the route, and wherein the second indicator is adjustable by the user.

6. The method of claim 5, wherein the outputting the second charging setting interface comprises:

determining a section of the route which satisfies a setting condition; and outputting the second indicator for at least a part of the section satisfying the setting condition.

7. The method of claim 6, wherein the setting condition comprises a condition for a section of high charging efficiency, wherein the section has a higher charging efficiency than other sections, and wherein the section of high charging efficiency comprises at least one of a flatland section or a down-hill section.

8. The method of claim 5, wherein the outputting the estimated driving result comprises updating, based on an input through at least one of the first charging setting interface or the second charging setting interface, at least one of the estimated SOC of the first battery or the estimated SOC of the second battery.

9. The method of claim 5, wherein the outputting via the user interface further comprises outputting a third charging setting interface including a third indicator, wherein the third indicator indicates charging the second battery at the at least one charging station, and wherein the third indicator is adjustable by the user.

10. The method of claim 1, further comprising executing, based on an input by a user, the charging plan, wherein the user determines, based on the estimated driving result, to approve the charging plan.

11. An electric vehicle comprising:

at least one driving motor configured to provide a driving force to the electric vehicle;

a first battery configured to supply power to the at least one driving motor;

a connector configured to electrically connect the first battery to a second battery; and a controller configured to:

determine whether the second battery is electrically connected to the first battery through the connector, determine, based on the second battery being electrically connected to the first battery, at least one charging station associated with a route to a destination of the electric vehicle, output, via a user interface, charging planning information for charging at least one of the first battery and the second battery, wherein the charging planning information indicates the at least one charging station;

output an estimated driving result for driving the electric vehicle to the destination, wherein the estimated driving result is associated with the charging planning information; and displaying, based on the estimated driving result, the user interface to receive a user input to control driving of the electric vehicle to execute a charging plan corresponding to the charging planning information.

12. The electric vehicle of claim 11, wherein the controller is further configured to determine, based on the second battery being electrically connected to the first battery and based on states of charge of the first battery and the second battery, the at least one charging station.

13. The electric vehicle of claim 11, wherein the controller is further configured to:

collect information related to at least one of a state of charge (SOC) of the first battery or an SOC of the second battery; and the at least one charging station located on a route to the destination.

14. The electric vehicle of claim 13, wherein the controller is further configured to output at least one of an estimated SOC of the first battery or an estimated SOC of the second battery at the destination.

15. The electric vehicle of claim 14, wherein the controller is further configured to:

output a first charging setting interface including a first indicator, wherein the first indicator is configured to indicate charging of the first battery at the at least one charging station, and wherein the first indicator is configured to be adjustable by a user; and output a second charging setting interface including a second indicator, wherein the second indicator is configured to indicate charging of the first battery by the second battery in at least a partial sections of the route, and wherein the second indicator is configured to be adjustable by the user.

16. The electric vehicle of claim 15, wherein the controller is further configured to:

determine a section of the route which satisfies a setting condition; and output the second indicator for at least a part of the section satisfying the setting condition.

17. The electric vehicle of claim 16, wherein the setting condition comprises a condition for a section of high charging efficiency, wherein the section has a higher charging efficiency than other sections, and wherein the section of high charging efficiency comprises at least one of a flatland section or a down-hill section.

18. The electric vehicle of claim 15, wherein the controller is further configured to update, based on an input through at least one of the first charging setting interface or the second charging setting interface, at least one of the estimated SOC of the first battery or the estimated SOC of the second battery.

19. The electric vehicle of claim 15, wherein the controller is further configured to output a third charge setting interface including a third indicator, wherein the third indicator is configured to indicate charging of the second battery at the at least one charging station, and wherein the third indicator is configured to be adjustable by the user.

20. The electric vehicle of claim 11, wherein the controller is further configured to execute, based on an input by a user, the charging plan, wherein the user determines, based on the estimated driving result, to approve the charging plan.

* * * * *